United States Patent
Bagal et al.

(10) Patent No.: US 7,913,050 B2
(45) Date of Patent: Mar. 22, 2011

(54) FENCING USING A HIERARCHICAL RELATIONSHIP

(75) Inventors: Prasad Bagal, San Jose, CA (US); John Leys, Hayward, CA (US); Gilberto Arnaiz, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 541 days.

(21) Appl. No.: 11/768,666

(22) Filed: Jun. 26, 2007

(65) Prior Publication Data

US 2009/0006797 A1 Jan. 1, 2009

(51) Int. Cl.
  *G06F 13/00* (2006.01)
  *G06F 13/28* (2006.01)
  *G06F 12/14* (2006.01)
(52) U.S. Cl. .................. 711/164; 711/163; 711/E12.091
(58) Field of Classification Search .................. None
  See application file for complete search history.

(56) References Cited

U.S. PATENT DOCUMENTS

| | | | |
|---|---|---|---|
| 5,416,921 A * | 5/1995 | Frey et al. ................. | 714/11 |
| 6,243,814 B1 | 6/2001 | Matena | |
| 6,662,219 B1 | 12/2003 | Nishanov et al. | |
| 7,010,528 B2 | 3/2006 | Curran et al. | |
| 7,076,783 B1 | 7/2006 | Frank et al. | |
| 7,260,818 B1 | 8/2007 | Iterum et al. | |
| 7,490,089 B1 | 2/2009 | Georgiev | |

* cited by examiner

*Primary Examiner* — Reginald G Bragdon
*Assistant Examiner* — Eric S Cardwell
(74) *Attorney, Agent, or Firm* — Hickman Palermo Truong & Becker LLP

(57) ABSTRACT

A method and apparatus for processing a write request at a storage device is provided. A write request that identifies a sender of the write request is received at a storage device. The write request is examined to determine the identity of the sender. A determination is made as to whether, within a hierarchical relationship, the sender is subordinate to any entity that has been designated as being unable to perform write requests at the storage device. Upon determining that (a) the sender is not subordinate to any entity that has been designated as being unable to perform write requests at the storage device, and (b) the sender has not been designated as being unable to perform write requests at the storage device, the sender is allowed to write to the storage device. Thereafter, the write request from the sender may be performed at the storage device.

16 Claims, 3 Drawing Sheets

US 7,913,050 B2

FENCING USING A HIERARCHICAL RELATIONSHIP

FIELD OF THE INVENTION

The present invention generally relates to the fencing of requests at a storage device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computers may work together in a group in many contexts. For example, two or more database servers executing on separate computers may work as a group in responding to requests to read from or write to a persistent storage mechanism, such as a database. Those in the art may refer to a certain group of computers working together as a logical unit as a "cluster."

In a cluster of computers (or "nodes"), each node of the cluster may issue a request to write data (a "write request") to a persistent storage mechanism. To ensure the accuracy of the data stored in the persistent storage mechanism, one or more nodes of the cluster may occasionally need to be prevented from performing write requests on the persistent storage mechanism. For example, when a network split occurs between portions of a cluster (the "split-brain problem"), a portion of the cluster may need to be prevented from performing write requests on the persistent storage mechanism to ensure one node does not write over changes made to the persistent storage mechanism by another node. Preventing a node from performing a write request on a persistent storage mechanism is called "fencing" the node.

Current approaches for performing fencing involve instructing the node(s) to be fenced to power down. Once the fenced node(s) have powered down, the other nodes of the cluster may continue with the assurance that the fenced node (s) will not issue any further write requests to the persistent storage mechanism.

To illustrate how fencing might be employed, assume that several nodes of a cluster (referred to as "the first cohort of nodes") are located at a first location and the other nodes of the cluster (referred to as "the second cohort of nodes") are located at a different location than the first location. Geographically separating the first cohort of nodes from the second cohort of nodes is advantageous because if a problem (such as a fire or a power outage) disrupts operation at the first location, then the second cohort of nodes (which is located at a different location than where the problem occurred) may continue to operate.

Each node of the cluster (i.e., each node in both the first cohort of nodes and the second cohort of nodes) may issue read requests and write requests to a persistent storage mechanism. To ensure the accuracy of the data within the persistent storage mechanism, only nodes of the cluster should be able to perform write requests on the persistent storage mechanism. However, there are occasions when one or more nodes of the cluster may become inoperable (for example, due to a network problem or an unexpected hardware problem occurring at a node), and therefore, may lose membership in the cluster. As a result, the node that lost membership in the cluster is instructed to power down. Once the node has powered down, the cluster may be assured that no further write requests, which if processed may corrupt the data stored in the persistent storage mechanism, will be issued by the node that lost membership to the cluster.

As another example, if a network connection between the first cohort of nodes and the second cohort of nodes becomes inoperable, then it would be desirable to prevent either the first cohort of nodes or the second cohort of nodes from performing write requests on the persistent storage mechanism to avoid either the first cohort of nodes or the second cohort of nodes writing over changes made by the other. In such a case, one of the first cohort of nodes and the second cohort of nodes would be fenced by instructing that cohort to power down, (thereby preventing nodes of that cohort from performing write operations on the persistent storage mechanism), and the other cohort of nodes would be allowed to operate as normal.

If a write request issued by a node is in transit over the network when the node is fenced, the write request may still be received by the persistent storage mechanism. In fact, the write request may be received after a point in time when the cluster considers it safe to resume normal operation. Consequently, the possibility exists that the data stored in the persistent storage mechanism may still become corrupted. Further, as the nodes of a cluster become more distant and separated, the likelihood of this scenario increases as write requests may spend a greater amount of time traversing the network from the sender to the persistent storage mechanism. Also, a malicious node might not power down when instructed to do so, and as a result, the node may continue to issue write requests to the persistent storage mechanism.

Current approaches for performing fencing operations also having difficulty scaling to support large clusters. In a typical enterprise system, many applications executing on different nodes need to collaborate with their peers on other nodes of the cluster. Depending on the nature of the collaboration, an application may need to either interact with all nodes of the cluster or just a subset of the nodes of the cluster. As a result, the interaction between each node of the cluster based on the needs of the application executing on a node of the cluster must be managed, either by each application itself or a centralized entity for the cluster. Managing this interaction requires an undesirable amount of resources.

Thus, an improved mechanism for performing fencing is desirable.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
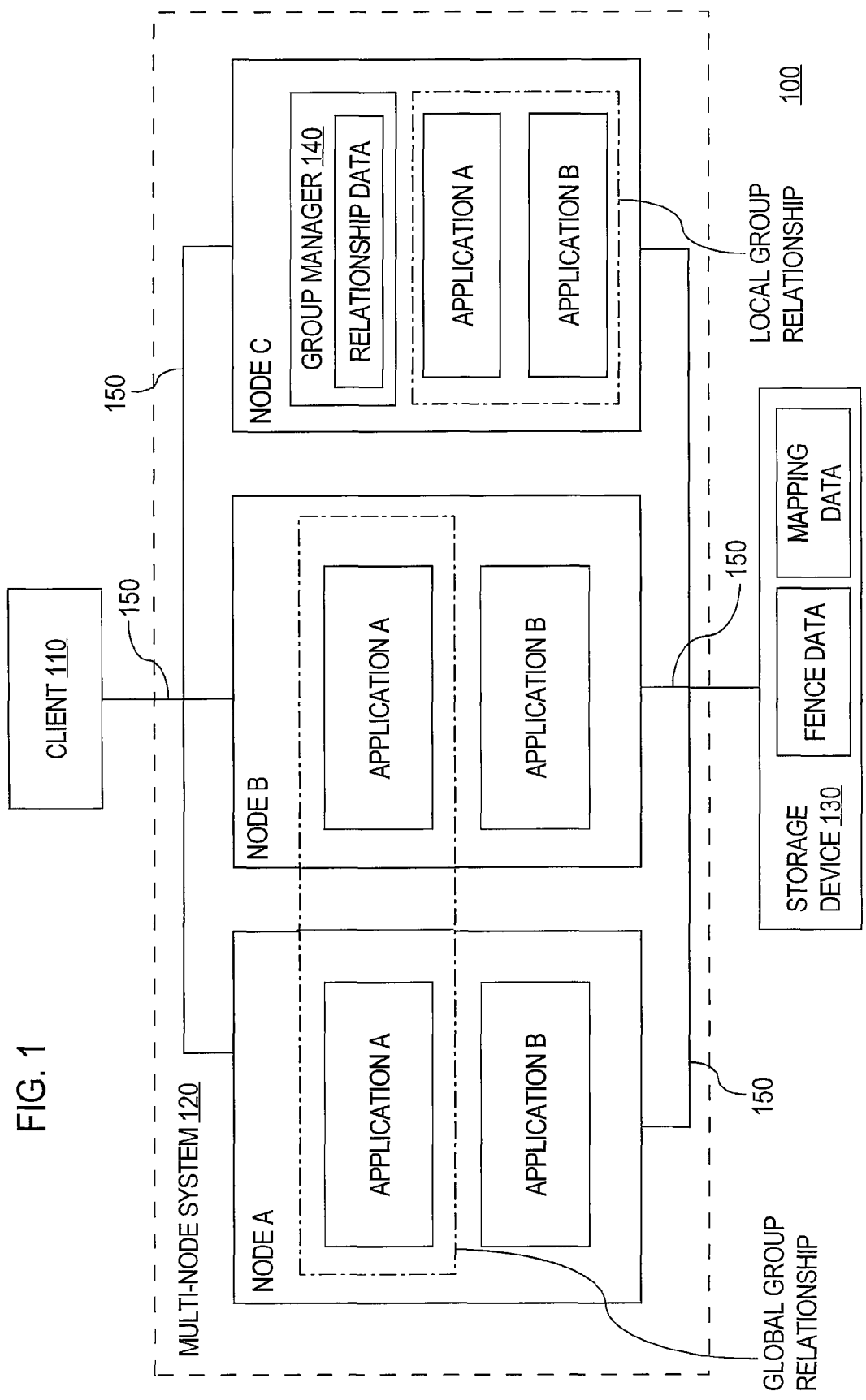
FIG. 1 is a block diagram illustrating a system according to an embodiment of the invention.

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Preventing an entity from successfully performing a write request on a persistent storage mechanism is called "fencing" the entity. Embodiments of the invention advantageously enable fencing of entities at different levels of granularity in a scalable fashion. For example, a fenced entity may correspond to a cluster of computers, a particular node in the cluster, a cluster of applications executing on the cluster, a particular application executing on a node of the cluster, a process, a thread, or an entity at any other level of granularity. Additionally, in an embodiment, multiple entities may be fenced by issuing a single request for a fence operation. Note that a fenced entity may still continue to issue write requests to a persistent storage mechanism; however, the persistent storage mechanism will not perform any write requests issued from the fenced entity.

In an embodiment, a storage device is instructed not to accept any I/O requests, such as a write request, from a particular entity. Subsequently, the storage device will not accept any I/O requests from the particular entity, or any entity that is subordinate to the particular entity in a hierarchical relationship. A first entity may be subordinate to a second entity in a hierarchical relationship established between the two entities if the first entity requires the second entity to be operational in order for the first entity to be operational. For example, a storage device may be instructed to fence a group of applications executing on a single node of a cluster, and as a result, the storage device will not perform any write requests from any processes associated with any application in the group of applications, since the processes are subordinate to the fenced group of applications.

According to an embodiment of the invention, a write request that identifies a sender of the write request is received at a storage device. The write request is examined to determine the identity of the sender. A determination is made as to whether, within a hierarchical relationship, the sender is subordinate to any entity that has been designated as being unable to perform write requests at the storage device. Upon determining that (a) the sender is not subordinate to any entity that has been designated as being unable to perform write requests at the storage device, and (b) the sender has not been designated as being unable to perform write requests at the storage device, the sender is allowed to write to the storage device. Thereafter, the write request from the sender may be performed at the storage device. As a result, embodiments of the invention advantageously enable fencing to be performed without requiring that the entity that is being fenced be powered down.

Architecture Overview

FIG. 1 is a block diagram illustrating a system according to an embodiment of the invention. System 100 includes a client 110, multi-node system 120, and storage device 130. Embodiments of the invention advantageously allow one or more entities corresponding to and/or within multi-node system 120 to be fenced.

Client 110 may be implemented by any hardware or software entity that is capable of communicating with multi-node system 120. A user may use client 110 to issue a request to a node of multi-node system 120. For example, the user may issue, to a node of multi-node system 120, a request to write data to or read data from storage device 130 or may issue a request to configure a node of multi-node system 120.

Multi-node system 120 corresponding to any system comprising of two or more nodes. An illustrative example of multi-node system 120 is a cluster of computers, each of which executes one or more applications. Each application of the cluster may communicate with one or more other applications in multi-node system 120. An application executing on a first node in the cluster may communicate with other application(s) on the first node and/or with other application(s) on a different node than the first node. While FIG. 1 depicts multi-node system 120 as having three nodes (node A, B, and C), in other embodiments of the invention, multi-node system 120 may have any number of nodes.

In an embodiment of the invention, two or more applications may be arranged in a group. Applications may join a group to facilitate communications between each other. For example, a particular application may have need to communicate with other applications, but the particular application may not be aware of applications that exist outside of the group of which the particular application is a member. The process of an application communicating with other applications within a group is described in further details in U.S. Patent Application entitled "CAPABILITY REQUIREMENTS FOR GROUP MEMBERSHIP," filed May 10, 2007, Ser. No. 11/801,805 the contents of which are incorporated by reference for all purposes as if fully set forth herein.

In an embodiment, a node of multi-node system 120 may execute group manager 140. Group manager 140 is a software module that provides group services for applications in a group in multi-node system 120. In an embodiment, group manager 140 exposes an interface (such as an API) that allows applications residing in multi-node system 120 to interact with group manager 140. For example, an application may communicate group manager 140 for purposes of joining and leaving a group or for defining and storing relationship data. Relationship data is data that describes the relationships that the application has with respect to other applications residing in multi-node system 120. Alternately, a user may use client 110 to issue a request to group manager 140 to configure relationship data for an entity in multi-node system 120. In addition, group manager 140 may also store information about multi-node system 120, such as an instantiation identifier that identifies that current instantiation of multi-node system 120. In an embodiment, group manager 140 may be implemented using Cluster Synchronization Services (CSS) module of Oracle 10g clusterware software available from Oracle Corporation, Inc. of Redwood Shores, Calif.

While only one group manager 140 is depicted in FIG. 1; in other embodiments of the invention, any number of group managers may reside in multi-node system 120. For example, each node of multi-node system 120 may have a group manager that performs functionality associated with a local group relationship (described in further detail below).

Storage device 130 may be implemented by any device which is capable of storing data. For example, storage device 130 may contain a database, and nodes of multi-node system 120 may issue database commands to the database stored on storage device 130 for purposes of reading data from or writing data to the database.

Communications link 150 may be implemented by any medium or mechanism that provides for the exchange of data between client 110, nodes of multi-node system 120, and storage device 130. Examples of communications link 150 include, without limitation, a network such as a Local Area Network (LAN), Wide Area Network (WAN), Ethernet or the Internet, or one or more terrestrial, satellite or wireless links.

The architecture depicted in FIG. 1 is merely illustrative of one embodiment of the invention, as other embodiments described herein may have a different architecture than that displayed in FIG. 1.

Fenceable Entities

Embodiments of the invention enable entities at different levels of granularity to be fenced. Indeed, embodiments of the invention may fence any logical entity. Table 1 is an illustrative list of entities which may be fenced by embodiments of the invention. The entities listed by Table 1 are merely illustrative, as other embodiments of the invention may depict other entities that are not listed in the examples shown in Table 1.

TABLE 1

| Level | Entity Name | Element of Uniqueness | Description |
|---|---|---|---|
| 1 | Cluster | Cluster name or multi-node system identifier | A collection of computers managed as a cluster |
| 2 | Node | Node name | A node in the cluster |
| 3 | Instance Group | Lock name space or Instance group identifier | A group of applications |
| 4 | Application | Application instance name | A particular instantiation of an application |
| 5 | Process | Process identifier | A process capable of issuing a I/O request |
| 6 | Thread | Thread identifier | A thread capable of issuing a I/O request |

Entities in the illustrative list of Table 1 are arranged in order from the highest level of granularity (a cluster at level 1) to the lowest level of granularity (a thread at level 6). As explained above, other entities besides those depicted in Table 1 may be fenced by other embodiments of the invention. For example, an application may break down the granularity even further than that depicted in Table 1. In this way, a hierarchy may be specific to the particular application/environment in which it is employed, e.g., one application may be able fence entities down to the thread level, while another application may be able to fence entities down to level of granularity lower than the thread level, such as a user thread level or a kernel thread level.

As shall be explained in further detail below, any fenceable entity in multi-node system 120 may be uniquely identified using one or more elements of uniqueness. The element(s) of uniqueness used to identify each type of entity displayed in Table 1 is merely illustrative of one embodiment, as other elements of uniqueness may be used by other embodiments.

Uniquely Identifying an Entity to the Storage Device

In an embodiment, each entity that issues a write request to storage device 130 uniquely identifies itself to storage device 130. According to one approach for doing so, before an entity issues a write request to a storage device, the entity issues an "introduction message" that contains information (referred to herein as a "key") that uniquely identifies the entity to the storage device. For example, the key may uniquely identify a particular entity by containing one or more elements of uniqueness that uniquely identifies the entity.

A particular entity of a certain level of granularity illustrated in Table 1 may be uniquely identified by concatenating elements of uniqueness that uniquely identify an entity associated with the particular entity at each level of granularity from the highest level of granularity to the level of granularity of the particular entity. As an example, a cluster may be uniquely identified by a cluster name that uniquely identifies the cluster. As another example, a node of a cluster may be uniquely identified by a concatenation of the cluster name of the cluster in which the node is in and a node name that uniquely identifies the node within the cluster. As another example, an instance group may be uniquely identified by a concatenation of the cluster name in which the instance group is in, the node name of the node or nodes in which the instance group is executing upon, and an instance group identifier that uniquely identifies the instance group on the node. As another example, a process may be uniquely identified by a concatenation of elements of uniqueness of levels 1-5 (the highest level of granularity to the level of granularity of a process) in Table 1 for the corresponding entities associated with the process.

In an embodiment, a particular entity in multi-node system 120 may obtain information about elements of uniqueness for the particular entity, used in the generating the key, by contacting group manager 140. As a result, group manager 140 may store information about elements of uniqueness for various entities within multi-node system 120, e.g., information about applications and entities that are subordinates of applications within multi-node system 120.

In an embodiment, after storage device 130 receives the introduction message, storage device 130 stores the key contained within the introduction message, and assigns the key a tag. A tag is information that uniquely identifies a key to storage device 130. After creating the tag, storage device 130 communicates the tag to the entity that issued the introduction message. Subsequently, each time that the entity issues a write request to the storage device, the write request will contain or identify the tag. Storage device 130 will examine the write request to identify the tag. Storage device 130 may determine the identity of the entity which sent the write request by examining the tag.

In an embodiment, storage device 130 may contain mapping data. Mapping data is data that identifies (a) keys that have been received at storage device 130, (b) tags that have been assigned by storage device 130, and (c) which tags are associated with which keys. In this way, once storage device examines a received write request to identify the tag contained or identified by the write request, the storage device 130 may use the mapping data to identify a key of a sender of a write request. Once storage device 130 identifies the key associated with the sender of the write request, the sender of the write request is identified to storage device 130.

Moreover, as explained above, the key may contain elements of uniqueness that uniquely identify other entities, associated with the sender, that are a higher level of granularity than the sender. For example, the key of a process also may identify the application, instance group, node, and cluster in which the process belongs. As a result, once storage device 130 identifies the key associated with the sender of the write request, other entities, associated with the sender, which are a higher level of granularity than the sender may also be identified to storage device 130.

In an embodiment, the tag may be smaller in size than the key. For example, while a particular key may be a large size (such as around approximately 100 bytes), the tag associated with the particular key may be a smaller size, such as 8 bytes. Reducing the size of a tag to a smaller size, relative to the key, is advantageous because each write request sent from an entity to storage device 130 contains a tag. In this way, the size of the write request may be reduced, thereby reducing the amount of data that needs to be transmitted over communications link 150.

Fencing an Entity Without Powering Down the Entity to be Fenced

In an embodiment, an entity in multi-node system 120 may be fenced without powering down the entity. Embodiments of the invention may issue a fence request (i.e., a request for a fence to be issued on one or more entities in multi-node system 120) to storage device 130 when a fencing event occurs. A fencing event, as broadly used herein, refers to any event in system 100 which results in a fence request being issued to storage device 130; fencing events are described in further detail below in the section entitled "Fencing events."

Different entities may be responsible for issuing a fence request to storage device 130. In an embodiment of the invention, a fencing request may be issued by an entity responsible for monitoring the entity to be fenced. For example, as explained in greater detail below in the section entitled "Group relationships," certain applications may belong to a group. If a first application in the group become inoperable or otherwise becomes inaccessible, a second application in the group may detect that the first application went down or otherwise became inaccessible, and the second application may subsequently issue a fence request to storage device 130 to cause a fence to be performed on the first application (in some circumstances described in further detail below, the second application may issue a fence on the node in which the first application is on if the second application cannot receive verification that the first application has been fenced).

In an embodiment, a fencing request may be issued by group manager 140. In such an embodiment, group manager 140 may be responsible for monitoring applications in multi-node system 120. If group manager 140 determines that an application in multi-node system 120 has become inoperable or otherwise inaccessible, then group manager 140 may issue a fence request on that application to storage device 130.

In an embodiment, an application may issue a fence on an entity of a lower granularity, such as a dead process of the application or a process which needs "cleaning-up," to ensure no outstanding I/O requests from the entity to be fenced will be processed at storage device 130.

When a fence request on a particular entity is received by storage device 130, the fence request informs storage device 130 that the particular entity has been designated as being unable to perform write requests on storage device 130. In response to receiving the fence request, storage device 130 updates fence data to reflect the newly received fence request. Fence data is data, maintained by storage device 130, which identifies to storage device 130 which entities have been designated as being unable to perform write requests on storage device 130.

In an embodiment, fence data may identify an entity that has been designated as being unable to perform write requests on storage device 130 using a tag as described above in the section entitled "Uniquely Identifying an Entity to the Storage Device." In such an embodiment, the fence request may contain or identify the tag that identifies the entity to be fenced. The entity that issues the fence request is either knowledgeable of the elements of uniqueness necessary to construct the tag to identify the entity to be fenced or may contact group manager 140 to obtain the elements of uniqueness necessary to construct the tag to identify the entity to be fenced.

After a fence request has been received at storage device, fence data stored at storage device 130 is updated to reflect that the entity to be fenced, identified by the fence request, has been designated as being unable to perform write requests at storage device 130. When storage device 130 receives a write request, storage device 130 examines the write request to determine the identity of the sender. Thereafter, storage device 130 examines the fence data to determine if the sender of the write request has been designated as being unable to perform write requests at storage device 130. If the sender of the write request has not been designated as being unable to perform write requests at storage device 130, then storage device 130 performs the write request.

On the other hand, if the sender of the write request has been designated as being unable to perform write requests at storage device 130, then storage device 130 does not enable the write request to be performed. As a result, in embodiments of the invention, the fence request may be performed to prevent the entity to be fenced without powering down the entity to be fenced.

In an embodiment, after fence data stored at storage device 130 is updated in response to a received fence request, storage device 130 informs the sender of the fence request that the fence request has been successfully performed.

As explained in more detail below, in certain embodiments of the invention, a fence request may also, in addition to the entity to be fenced identified by the fence request, cause a fence to be performed on any entity that is subordinate to the entity to be fenced identified by the fence request.

Group Relationships

Applications executing in multi-node system 120 typically have relationships with other applications in multi-node system 120. Such relationships may be embodied as a group. The group may be established by defining the group, and its member applications, in relationship data stored and maintained by group manager 140. Such relationships include a global group relationship, a local group relationship, and a notification relationship. A global group relationship is a group of applications where the member applications execute on two or more nodes. On the other hand, a local group relationship is a group of applications where the member applications execute on a single node. Member applications of a local group relationship are only visible to processes executing on the node in which the local group relationship is created upon.

In an embodiment, applications of a global group relationship or a local group relationship may have a hierarchical relationship between applications of the group. In the hierarchical relationship, a first entity is lower in the hierarchical relationship (referred to herein as subordinate) to a second entity if the first entity requires that, in order to function properly, the second entity also function properly.

For example, entity A, B, and C may be involved in a local group relationship. Assume that A is higher in a hierarchical relationship than entity B (because entity B requires that entity A be functioning properly in order to function properly), and further assume that entity B is higher in the hierarchical relationship than entity C (because entity C requires that entity B be functioning properly in order to function properly). If entity C is the subject of a fence operation, then neither entity A nor entity B will be impacted. However, if entity B is the subject of a fence operation, then entity C will also be fenced since entity C is subordinate to entity B. Similarly, if entity A is the subject of a fence operation, then both entity B and entity C will also be fenced since entity B and entity C are subordinate to entity A.

In an embodiment, there are two different types of a local group relationship, namely an explicit local group relationship and an implicit local group relationship. An explicit local group relationship is a local group relationship having a hierarchical relationship that is defined by a user or an application in the local group relationship by storing relationship data in group manager 140. For example, an administrator may store relationship data in group manager 140 that defines an explicit local group relationship on two applications (namely, application A and application B on node C) executing on the same node. The two applications may be separate and distinct; however, application B may be subordinate to application A because application B requires that, in order to function properly, application A must also be functioning properly. Thus, if a fence is issued on application A, it would be desirable to also fence application B. As a result, both application A and application B may be assigned to an explicit local group relationship (where application B is subordinate to application A) by a user by defining the explicit local group relationship in relationship data stored in group manager 140.

An implicit local group relationship is a local group relationship between entities where a first entity, which is subordinate to a second entity, is a part of the second entity. For example, an application may comprise a plurality of processes. Each of the plurality of processes is subordinate to the application, because if the application is the subject of a fence operation, each of the plurality of processes should also be fenced. As another example, each application in a group of applications is subordinate to the group of application, because if the group of applications is the subject of a fence operation, each application in the group of applications should also be fenced.

Embodiments of the invention will not allow a write request from an entity to be performed on storage 130 if that entity is subordinate to another entity that has been fenced. In this way, if a first entity is the subject of a fence operation, and a second entity requires that the first entity be operational for the second entity to be operational, then the second entity will also not be allowed to perform write operations.

In an embodiment, when storage device 130 receives a write request, storage device 130 examines the write request to determine the identity of the sender. Thereafter, storage device 130 examines the fence data to determine if the sender of the write request has been designated as being unable to perform write requests at storage device 130. After storage device 130 examines the fence data, storage device 130 determines if the sender is subordinate to any other entities that have been fenced, and if so, then the sender is also fenced, and the write request from the sender is not performed on storage device 130. On the other hand, if the sender of the write request has not been designated as being unable to perform write requests at storage device 130, and the sender is also not subordinate to any entities that have been fenced, then storage device 130 performs the write request.

In an embodiment, relationship data that defines an explicit local group relationship is transmitted from group manager 140 to storage device 130. In another embodiment, the user could define and store relationship data that defines an explicit local group relationship at storage device 130 without transferring the data from group manager 140. Storing relationship data that defines an explicit local group relationship at storage device 130 enables storage device 130 to determine whether, when receiving a fence request to perform a fence operation on a first entity, the first entity is in an explicit local group relationship with any other entities. If the fenced first entity is in an explicit local group relationship with any other entities, then storage device 130 will not allow a write request to be performed from entities that are subordinate to the fenced first entity in an explicit local group relationship.

Notification Relationships

A user may also configure and store relationship data in group manager 140 that defines a notification relationship. A notification relationship is a relationship between a group of applications in multi-node system 120, wherein if any application of the notification relationship goes down or otherwise becomes unavailable or inaccessible, then the other members of the notification relationship are notified. When group manager 140 detects that an application of a notification relationship has gone down or is otherwise unavailable or inaccessible, then group manager 140 informs the other applications of the notification relationship (referred to as "peers" of the entity that went down or is otherwise inaccessible). In this way, the peers of an application that has gone down or is otherwise unavailable or inaccessible may begin recovery on the application that has gone down or is otherwise unavailable or inaccessible.

In an embodiment, group manager 140 may not notify applications of the notification relationship that an application in the notification relationship went down or is otherwise unavailable or inaccessible until group manager 140 receives confirmation that the entity that went down or is otherwise unavailable or inaccessible has been fenced.

For example, when a storage management application executing on a first node of multi-node system 120 goes down, peers of that application may wish to be aware of that fact so that the peers may begin recovery. In an embodiment, the peers of the application that went down should not begin recovery until all I/O requests from the application that went down are squelched. Therefore, in an embodiment, group manager 140 does not notify peers of the application that went down until all the application that went down has been fenced. In this way, the peers of the application that went down may be assured that any outstanding I/O requests, from the application that went down, will not be performed on storage device 130.

Fencing Events

Any event which requires that an entity is to be fenced is referred to as a fencing event. A fencing event may be the result of a voluntary action or an involuntary action. An example of a voluntary fencing event is when an entity voluntary leaves a group, e.g., when an application, on its own initiative, determines the application should leave a global group relationship. When an entity leaves a group, a fence is issued on the entity that left the group to ensure the group, or any storage device members of the group interact with, does not enter an inconsistent state.

An example of an involuntary fencing event is when an entity, without advanced notice, suddenly ceases to execute due to a hardware or power failure.

In an embodiment, if a peer of an entity in a notification relationship has not received a communication from the entity after a specified time interval, then the peer may conclude that the entity has gone down or is otherwise inaccessible or unavailable. As a result, the peer may issue a fence request to fence the entity. After the peer receives confirmation that the entity has been fenced, then the peer can begin recovery mechanism.

Applications may exchange communications with one another. In fact, the proper functioning of one application may hinge upon exchanging communications from another application. In an embodiment, when a response from a first application is not received by a second application executing on a different node than the first application, the second application may wait a first configurable period of time to see if the first application will be the subject of a fence. If the first application and the second application are in the same group, then the second application will be notified when a fence is successfully performed on the first application. However, if, after a second configurable period of time, the second application still has not received notification that a fence has been performed on the first application, then the second application may try to issue a fence on the first application. For example, the group manager on the node on which the first application is executing may not be able to perform the fence operation on the first application because communication with storage device 130 may be lost.

If the second application is unable to issue a fence on the first application, then the second application may escalate the problem by attempting to issue a fence on the node on which the first application is executing. After the fence of the node on which the first application is executing is successful, the first application may continue normal operation, which may include performing a recovery mechanism on the node that was fenced.

In an embodiment, each time that multi-node system 120 is started up, a new multi-node system identifier (information that uniquely identifies the particular incarnation of multi-node system 120; this information may also be referred to as a cluster identifier or cluster name in certain embodiments) is assigned to the new incarnation of multi-node system. In the event that multi-node system 120 becomes unavailable (for example, due to a power outage or other event which makes all nodes of multi-node system 120 inaccessible), after the new multi-node system identifier is assigned to multi-node system 120, multi-node system 120 transmits the new multi-node system identifier to storage device 130. When storage device 130 receives the new multi-node system identifier, storage device 130 invalidates any tags associated with the previous multi-node system identifier. Subsequently, if a write request from an entity of the previous incarnation of multi-node system 120 is received by storage device 130, storage device 130 may determine that the write request should not be performed at storage device 130 because the write request would not have a valid tag.

Processing a Write Request at a Storage Device

Figure 2:
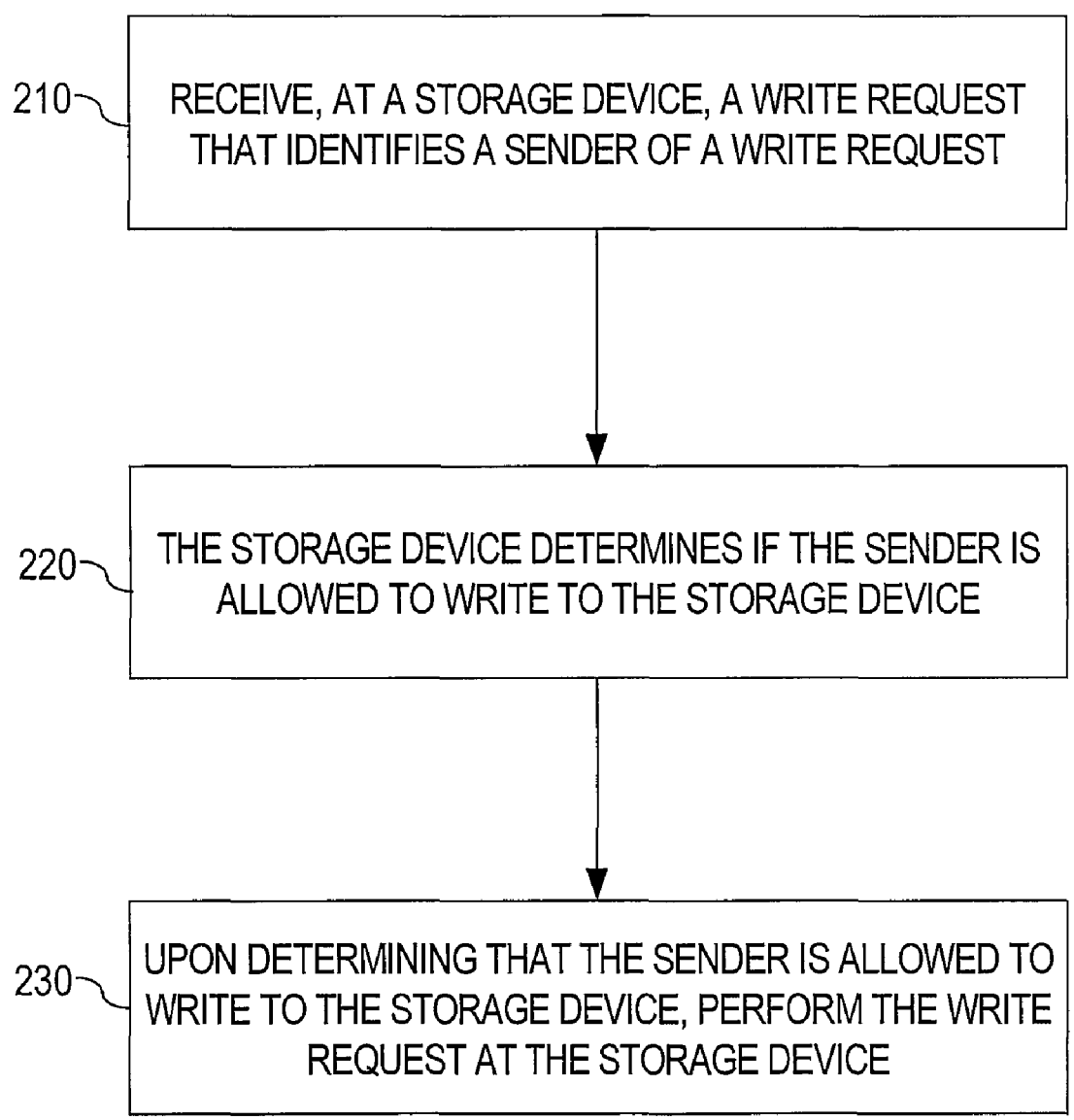
FIG. 2 is a flowchart illustrating the functional steps of processing a write request at a storage device according to an embodiment of the invention.

FIG. 2 is a flowchart illustrating the functional steps of processing a write request at a storage device according to an embodiment of the invention. In step 210, a write request that identifies a sender of a write request is received at storage 130. For example, step 210 may be performed by a sender including a tag in the write request, although other approaches may be used.

In step 220, storage device 130 determines if the sender is allowed to write to storage device 130. Storage device 130 may make this determination by consulting fence data to determine if the sender, or another entity to which the sender is subordinate to, has been designated as being unable to perform write operations at storage device 130. In step 230, upon determining that the sender is allowed to write to storage device 130, storage device 130 performs the write request at storage device 130.

Embodiments of the invention discussed herein feature numerous advantages. For example, in an embodiment of the invention, clusters may scale to support greater loads with greater success. The ability to scale is a consideration in the formation of large clusters. This is so because local group relationships allow the processing of fencing events by application in the local group relationship without broadcasting messages to the rest of multi-node system 120, thereby reducing network traffic over communications link 150. Thus, in an embodiment, if a fencing event only concerns a single node of multi-node system 120, then the other nodes of the multi-node system 120 are not sent messages concerning the fencing event, which also reduces the processing that those nodes need to perform, further enhancing scalability.

In an embodiment, establishing hierarchical relationships between entities in multi-node system allows group manager 140 to have a finer granular control of what entities need to be fenced in response to fencing events.

While embodiment of the invention have been discussed with reference to fencing a write request issued by an entity to a storage device, embodiments of the invention may fence any type of request or communication issued from a first entity to a second entity. For example, embodiments of the invention may be used to fence any I/O request issued from a particular entity to a storage device. Thus, embodiments of the invention may even be used to fence read requests. Consequently, while certain embodiments above have been discussed with reference to fencing a write request, those skilled in the art shall understand that embodiments of the invention may be used to fence any type of request or communication, including an I/O request.

Implementing Mechanisms

Figure 3:
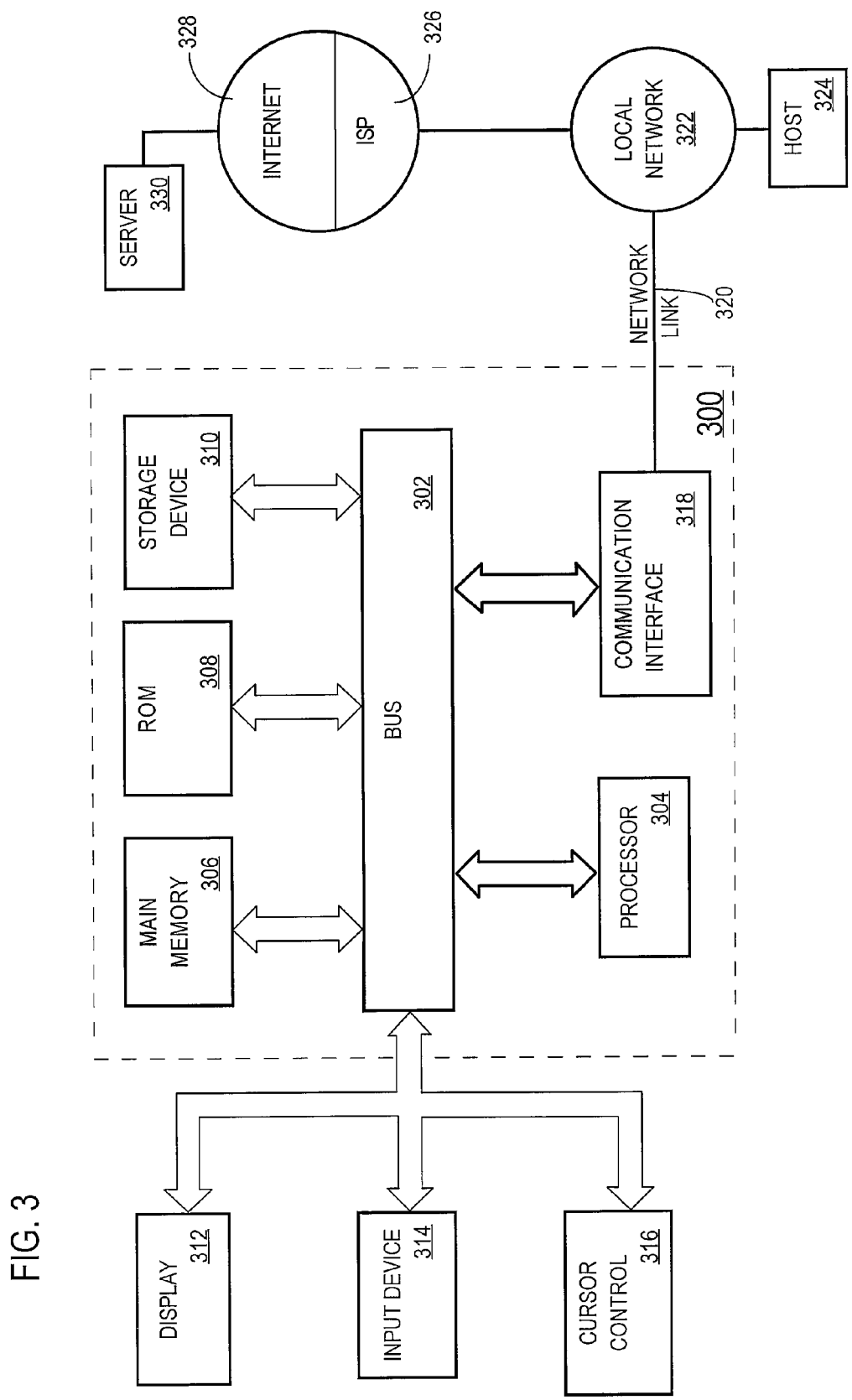
FIG. 3 is a block diagram that illustrates a computer system upon which an embodiment of the invention may be implemented.

Client 110, each node of multi-node system 120, and storage device 130 may each be implemented on a computer system. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for processing a write request at a storage device, comprising:
   receiving for each fence-able entity of a plurality of fence-able entities, a message that identifies at least one ascendant to which said each fence-able entity is subordinate in a fence-able entity hierarchy of a plurality of fence-able entity hierarchies;
   in response to receiving the messages, generating and storing relationship data that specifies said plurality of fence-able entity hierarchies;
   wherein the plurality of fence-able entity hierarchies include a first fence-able entity hierarchy with a first number of hierarchical levels and a second fence-able entity hierarchy with a second number of hierarchical levels that is different than said first number;
   receiving, at said storage device, a write request that identifies a sender of said write request;
   the storage device determining if said sender is allowed to write to said storage device by performing:
      examining said write request to determine an identity of said sender,
      based on the relationship data, determining whether, within a particular fence-able entity hierarchy of said plurality of fence-able entity hierarchies, the sender is subordinate to any fence-able entity that has been designated as being unable to perform write requests at said storage device, and upon determining that (a) the sender is not subordinate to any fence-able entity that has been designated as being unable to perform write requests at said storage device, and (b) the sender has not been designated as being unable to perform write requests at said storage device, then concluding that said sender is allowed to write to said storage device; and upon determining that said sender is allowed to write to said storage device, performing said write request at said storage device.

2. The method of claim 1, wherein examining said write request to determine said identity of said sender comprises:

examining said write request to identify one or more elements of uniqueness which identifies (a) the sender of said write request, and (b) at least one other fence-able-entity in said particular fence-able entity hierarchy.

3. The method of claim 1, wherein examining said write request to determine said identity of said sender comprises:

examining said write request to identify tag data, wherein said tag data was supplied to said sender from said storage device, and wherein said tag data identifies, to said storage device, the sender of said write request.

4. The method of claim 1, further comprising:

in response to receiving one or more elements of uniqueness that identify said sender, generating a tag which identifies said sender to said storage device based on said one or more elements of uniqueness; and providing said tag to said sender.

5. The method of claim 1, further comprising:

receiving, at said storage device, another write request that identifies said sender of said another write request;

the storage device determining if said sender is allowed to write to said storage device by performing:

examining said another write request to determine the identity of said sender, based on the relationship data, determining whether, within said particular fence-able entity hierarchy of said plurality of fence-able entity hierarchies, the sender is subordinate to any fence-able entity that has been designated as being unable to perform write requests at said storage device, and upon determining that either (a) the sender is a subordinate to an entity that has been designated as being unable to perform write requests at said storage device, or (b) the sender has been designated as being unable to perform write requests at said storage device, then concluding that said request is not to be performed on said storage device.

6. The method of claim 1, further comprising:

receiving, at said storage device, a multi-node system identifier that uniquely identifies a current instantiation of said multi-node system; and in response to receiving said multi-node system identifier, preventing any entity associated with a prior instantiation of said multi-node system from performing write requests on said storage device.

7. The method of claim 1, wherein all entities in said particular fence-able entity hierarchy reside on or correspond to a single node of a multi-node system.

8. The method of claim 1, further comprising:

receiving, at said storage device, a message indicating that a particular entity in said particular fence-able entity hierarchy is designated as being unable to perform write requests at said storage device; and wherein said message was transmitted in response to a peer of said particular entity determining that a subordinate of said particular entity may be inoperable or inaccessible.

9. One or more computer-readable storage media storing one or more sets of instructions for processing a write request at a storage device, which when executed by one or more processors, causes:

receiving for each fence-able entity of a plurality of fence-able entities, a message that identifies at least one ascendant to which said each fence-able entity is subordinate in a fence-able entity hierarchy of a plurality of fence-able entity hierarchies;

in response to receiving the messages, generating and storing relationship data that specifies said plurality of fence-able entity hierarchies;

wherein the plurality of fence-able entity hierarchies include a first fence-able entity hierarchy with a first number of hierarchical levels and a second fence-able entity hierarchy with a second number of hierarchical levels that is different than said first number;

receiving, at said storage device, a write request that identifies a sender of said write request;

the storage device determining if said sender is allowed to write to said storage device by performing:

examining said write request to determine an identity of said sender, based on the relationship data, determining whether, within a particular fence-able entity hierarchy of said plurality of fence-able entity hierarchies, the sender is subordinate to any fence-able entity that has been designated as being unable to perform write requests at said storage device, and upon determining that (a) the sender is not subordinate to any fence-able entity that has been designated as being unable to perform write requests at said storage device, and (b) the sender has not been designated as being unable to perform write requests at said storage device, then concluding that said sender is allowed to write to said storage device; and upon determining that said sender is allowed to write to said storage device, performing said write request at said storage device.

10. The one or more computer-readable storage media of claim 9, wherein examining said write request to determine said identity of said sender comprises:

examining said write request to identify one or more elements of uniqueness which identifies (a) the sender of said write request, and (b) at least one other fence-able-entity in said particular fence-able entity hierarchy.

11. The one or more computer-readable storage media of claim 9, wherein examining said write request to determine said identity of said sender comprises:

examining said write request to identify tag data, wherein said tag data was supplied to said sender from said storage device, and wherein said tag data identifies, to said storage device, the sender of said write request.

12. The one or more computer-readable storage media of claim 9, wherein execution of the one or more sets of instructions by the one or more processors further causes:

in response to receiving one or more elements of uniqueness that identify said sender, generating a tag which identifies said sender to said storage device based on said one or more elements of uniqueness; and providing said tag to said sender.

13. The one or more computer-readable storage media of claim 9, wherein execution of the one or more sets of instructions by the one or more processors further causes:

receiving, at said storage device, another write request that identifies said sender of said another write request;

the storage device determining if said sender is allowed to write to said storage device by performing:

examining said another write request to determine the identity of said sender, based on the relationship data, determining whether, within said particular fence-able entity hierarchy of said plurality of fence-able entity hierarchies, the sender is subordinate to any fence-able entity that has been designated as being unable to perform write requests at said storage device, and upon determining that either (a) the sender is a subordinate to an entity that has been designated as being unable to perform write requests at said storage device, or (b) the sender has been designated as being unable to perform write requests at said storage device, then concluding that said request is not to be performed on said storage device.

14. The one or more computer-readable storage media of claim 9, wherein execution of the one or more sets of instructions by the one or more processors further causes:

receiving, at said storage device, a multi-node system identifier that uniquely identifies a current instantiation of said multi-node system; and in response to receiving said multi-node system identifier, preventing any entity associated with a prior instantiation of said multi-node system from performing write requests on said storage device.

15. The one or more computer-readable storage media of claim 9, wherein all entities in said hierarchical relationship reside on or correspond to a single node of a multi-node system.

16. The one or more computer-readable storage media of claim 9, wherein execution of the one or more sets of instructions by the one or more processors further causes:

receiving, at said storage device, a message indicating that a particular entity in said particular fence-able entity hierarchy is designated as being unable to perform write requests at said storage device; and wherein said message was transmitted in response to a peer of said particular entity determining that a subordinate of said particular entity may be inoperable or inaccessible.

* * * * *